United States Patent [19]
Ahn et al.

[11] Patent Number: 5,316,643
[45] Date of Patent: May 31, 1994

[54] APPARATUS FOR THE STORAGE AND CONVERSION OF ENERGY

[75] Inventors: Jochen Ahn, Freiburg; Konstantin Ledjeff, Bad Krozingen, both of Fed. Rep. of Germany

[73] Assignee: Fraunhofer Gesellschaft zur Forderung der angewandten Forschund e.v., Fed. Rep. of Germany

[21] Appl. No.: 908,907

[22] Filed: Jul. 2, 1992

Related U.S. Application Data

[63] Continuation of Ser. No. 751,444, Aug. 30, 1991, abandoned.

[30] Foreign Application Priority Data

Aug. 31, 1990 [DE] Fed. Rep. of Germany ....... 4027655

[51] Int. Cl.$^5$ .............................................. C25B 9/00
[52] U.S. Cl. .................................. 204/265; 204/266; 204/DIG. 4; 204/290 R; 429/30; 429/33; 429/34; 429/39; 429/45
[58] Field of Search ................. 204/DIG. 4, 203, 265, 204/266, 290 R; 429/30, 33, 34, 39, 45, 12, 13

[56] References Cited

U.S. PATENT DOCUMENTS

| | | | |
|---|---|---|---|
| 3,996,064 | 12/1976 | Thaller | 429/23 |
| 4,175,165 | 11/1979 | Adlhart | 429/30 |
| 4,215,183 | 7/1980 | MacLeod | 429/30 |
| 4,341,848 | 7/1982 | Liu et al. | 429/27 |
| 4,671,863 | 6/1987 | Tejeda | 204/266 |

*Primary Examiner*—Kathryn Gorgos
*Attorney, Agent, or Firm*—Evenson, McKeown, Edwards & Lenahan

[57] ABSTRACT

A process and an apparatus for the storage and the conversion of energy having a $H_2/O_2/H_2O$ system by switching the mode of operation electrolytic/fuel cell reaction, with a cell being utilized which is composed of an anode compartment, a cathode compartment and an ion exchange membrane as the electrolyte. Bifunctional oxidation electrodes are utilized as electrodes in the anode compartment so that during electrolytic operation oxygen is formed and during fuel cell operation hydrogen is oxidized and with a bifunctional reduction electrode also being utilized in the cathode compartment so that during electrolytic operation hydrogen is formed and during fuel cell operation oxygen is reduced.

8 Claims, 2 Drawing Sheets

APPARATUS FOR THE STORAGE AND CONVERSION OF ENERGY

This is a continuation, of application Ser. No. 07/751,444, filed Aug. 30, 1991, now abandoned.

BACKGROUND AND SUMMARY OF THE INVENTION

The present invention relates to a process for the storage and conversion of energy by means of a cell having an anode compartment, a cathode compartment and an ion exchange membrane as the electrolyte and to an apparatus for carrying out the same.

Electrolytic cells of this type are known. By way of illustration, a cell having a special ion exchange membrane as the electrolyte is described in U.S. Pat. No. 4,175,165 (Adlhart). Other cells of this type are described in U.S. Pat. No. 3,779,8ll (Bushnell et al.), U.S. Pat. No. 3,297,484 (Niedrach) and U.S. Pat. No. 4,529,670.

All the cells described in these patents have an anode compartment, a cathode compartment and an ion exchange membrane as the electrolyte; however, they are of greatly varying design and construction.

The cells known from these patents are employed in particular as fuel cells. These are galvanic cells that continuously convert the chemical change in energy in a fuel oxidation reaction into electric energy, with a differentiation being made between "hot" and "cold" combustion.

In "hot" combustion in an oven, the electron transition from the fuel molecule (usually hydrogen), which serves as the electron donor, to the oxidation molecule (usually oxygen), which serves as the electron acceptor, is usually irreversible in the short circuit due to the direct contact of the two reactants, with heat being generated.

In "cold" combustion in a fuel cell, however, this electron transition is largely reversible at two separate points: at the negative electrode (anode), the fuel molecules strip the electrons with positive fuel ions being formed in the surrounding electrolyte, and at the cathode (positive electrode), the oxidant molecules picking up electrons form negative oxidant ions in the electrolyte. If the anode and the cathode are connected via an electric user, the oxidation reaction proceeds to the extent as the user consumes, e.g., "demands" current. In cold combustion in the fuel cell, most of the reaction heat becomes available in the user as high-quality electric energy. Fuel and oxidant ions migrate in the electrolyte and unite there to form a reaction product, by way of illustration in the case of hydrogen/oxygen to form water, with the electric circuit being closed.

As previously explained, the individual reactions in a fuel cell, by way of illustration in a hydrogen/oxygen fuel cell, are reversible so that they can run inversely.

If the mode of operation of a cell having an anode compartment, a cathode compartment and an ion exchange membrane as the electrolyte is reversed, the apparatus no longer operates as a fuel cell, but rather as an electrolyzer (hereinafter referred to as electrolytic cell) which generates the electrolytic gases hydrogen and oxygen against a certain overpressure.

For this reason, it has been numerously proposed to utilize a cell having an anode compartment, a cathode compartment and an ion exchange membrane as the electrolyte for the conversion and the storage of energy in order to store electric energy, in particular, over long periods of time, e.g. a year, in this manner. Long storage periods of this kind are, e.g., required for the economic exploitation of solar energy. The use of secondary elements for storing solar energy over a long period of time is not only very expensive, but also not very efficient due to the high degree of self-discharging over longer periods of time.

The attempts at developing a fuel cell that may be utilized for both the conversion and the storage of energy hitherto described in the literature (e.g., Hydrogen/Oxygen (Society of Plastics Engineers) electrochemical devices for Zero-G applications. Proceedings of the European Space Power Conference; Madrid, Spain, October 2-6, 1989) are always based on a bifunctional oxygen electrode and a bifunctional hydrogen electrode. In other words, during electrolytic operation at the one electrode, oxygen is formed and during fuel cell operation, oxygen is reduced. At the other electrode during electrolytic operation, hydrogen is formed, and during fuel cell, operation hydrogen is oxidized.

However, the following problems crop up in cells of this type having a cation exchange membrane as the electrolyte.

Due to the selection of the catalyst for the oxygen electrode, a loss in efficiency must be accepted as platinum, which is required for the reduction of oxygen, is not the best electrocatalyst for the formation of oxygen and, therefore, diminishes the effectivity of the electrolysis.

In order for the oxygen reduction to take place in the fuel cells with cation exchange membranes, moreover, in order to remove the reaction and transfer water, a hydrophobic layer, e.g. in the form of hydrophobic graphite paper, is required at the electrocatalyst. During electrolysis, however, this hydrophobic graphite paper dissolves due to the anodic oxidation resulting from the high anodic potential of the oxygen formation.

An object of the present invention is to provide a process for the conversion and the storage of energy that operates with an electrolytic cell which has an ion exchange membrane as the electrolyte that possesses a high degree of effectivity both in storing electric energy over a long period of time (e.g., a year) or short periods and at the same time permits converting energy.

Another object of the present invention is to provide a process that operates with a $H_2/O_2/H_2O$-system.

Furthermore, an object of the present invention is to provide an apparatus for carrying out the aforementioned process.

These and other objectives are achieved by the present invention which provides a process for the storage and the conversion of energy by a cell having an anode compartment, a cathode compartment and an ion exchange membrane as the electrolyte. The cell is operated as a fuel cell for converting energy, and as an electrolytic cell for storing energy. In the anode compartment, a bifunctional oxidation electrode is used; while in the cathode compartment, a bifunctional reduction electrode is used.

In the process of the present invention, a fuel cell having an ion exchange membrane as the electrolyte is employed. The electrode arrangement in the anode compartment is a bifunctional oxidation electrode so that during electrolytic operation, by way of illustration, oxygen is formed and during fuel cell operation, by way of illustration, hydrogen is oxidized. A bifunctional reduction electrode is also utilized in the cathode compartment so that (e.g.) hydrogen is formed during electrolytic operation and oxygen is reduced during fuel cell operation.

Therefore, contrary to the state of the art, oxygen is not formed at an electrode, e.g. during electrolytic operation and oxygen is not reduced during fuel cell operation. Rather, when the mode of operation is switched from electrolysis to fuel reaction or vice versa, the type of gas switches between oxygen and hydrogen in the anode compartment and the cathode compartment. In other words, at one electrode, oxygen is formed during electrolytic operation and hydrogen is oxidized during fuel cell operation; while at the other electrode, hydrogen is formed during electrolytic operation and oxygen is reduced during fuel cell operation.

Therefore, an element of the present invention is that the process utilizes such bifunctional oxidation and reduction electrodes. Employing these bifunctional electrodes permits attaining improved storage effectivity due to the ability to select a more suitable catalyst for both reactions of a bifunctional electrode. Thus, e.g., rhodium oxide or iridium oxide, which is a much better catalyst for oxygen formation than platinum, may be employed as the oxidation electrode. On the other hand, there appears to be no negative effects using rhodium oxide or iridium oxide as the electrocatalyst for hydrogen oxidation in comparison with platinum. Moreover, the hydrophobic graphite paper required for oxygen reduction is not destroyed by anodic oxidation. In this manner, the use of such bifunctional oxidation and reduction electrodes permits avoiding the two major difficulties in constructing an electrochemical cell having a cation exchange membrane as the electrolyte and possibly alternating use as a hydro-electrolyzer and a $H_2/O_2$ fuel cell.

Advantageously, a cell of this type having bifunctional oxidation, or reduction, electrodes described above is operated in such a way that during electrolytic operation water is conducted through the anode compartment and the resulting oxygen and hydrogen is stored in the corresponding storage means.

Subsequently, the cell is operated as a fuel cell as required. The hydrogen and oxygen therefor is drawn from a storage means, with the hydrogen being conducted through the anode compartment and the oxygen through the cathode compartment.

The respective electrolysis cycles, or fuel cycles, may be repeated as often as desired. The duration of the cycles depends on the respective requirements and the layout of the cell. In the area of exploitation of regenerable energy, it is quite possible to store up to a year and then commence the fuel cell cycle. On the other hand, cycles ranging from minutes to hours can also be conducted for respective needs.

A feature of the present invention is that the hydrogen, or the oxygen, is not initially generated by electrolysis in the first step of the process, but rather that the hydrogen and the oxygen are drawn from an external gas storage means, e.g. natural gas deposits. The hydrogen/oxygen is conducted to the cell and the cell is subsequently operated as a fuel cell, i.e. hydrogen is conducted through the anode compartment and oxygen through the cathode compartment. Thereupon, the cell is operated as the electrolytic cell, with the hydrogen being conducted through the anode compartment as previously described above and the resulting oxygen and hydrogen being stored. Thereupon, the fuel cell and the electrolytic cycles can again follow.

Advantageously during the electrolytic cycle, this distilled water is conducted cyclically from the water container through the anode compartment. It is provided that, if need be, water from an external source can be conducted into the water container, which may be the case if there is a loss of water due to evaporation.

In another advantageous embodiment, it is provided that during the electrolytic cycle the oxygen formed in the anode compartment is carried along by the water circulating in the cycle, separated from the water in a gas separator, which is connected thereafter, and subsequently conducted to the oxygen storage means.

In a further advantageous embodiment, the oxygen is conducted via a gas dryer, which is connected before the oxygen storage means. In this way, it is ensured that the oxygen storage means contains only dried gas so that it can again be immediately conducted into the next cycle.

Moreover, another feature of the present invention is that the transfer water, i.e. water which is transported through the ion exchange membrane by the protons evolved during the electrolytic cycle, is removed from the system by a water separator, which is connected after the cell. The resulting hydrogen is then conducted into a hydrogen storage means. In the case of hydrogen, an advantageous embodiment of the present invention provides that the hydrogen is conducted into the hydrogen storage means via a gas dryer in which is connected before the storage means.

In accordance with the present invention, the operational gases are conducted cyclically through the corresponding cathode, or anode, compartments during the fuel cell process. Subsequently, the oxygen is conducted cyclically from the oxygen storage means out through the cathode compartment and hydrogen is conducted cyclically from the hydrogen storage means through the anode compartment. In an advantageous embodiment the oxygen, or hydrogen, is conducted through a wetting agent/condenser prior to being introduced into the cell.

Another feature of the present invention is that the cell is scavenged with a stream of inert gas, e.g. nitrogen, when the mode of operation is switched, i.e., between the individual electrolytic, respectively fuel cell, cycles. This ensures that no residual gases from a previous cycle are in the cell.

The cell employed in the process of the present invention has specially designed bifunctional oxidation, or reduction, electrodes and an ion exchange membrane as the electrolyte, a hydrophobic structure, a material distribution system and current collectors.

The bifunctional electrodes are constructed in such a manner that they include a catalyst layer which is applied to the membrane and/or to a porous carrier as a stable unit between the material distribution system and the membrane, or the hydrophobic structure and the membrane and/or the material distribution system, or the hydrophobic structure. The amount of catalyst may lie between 0.1 and 10 mg/cm$^2$. For both sides, the catalyst may be platinum, rhodium, ruthenium, palladium, osmium, rhenium and/or alloys thereof and/or oxides. Preferably, rhodium and iridium are utilized.

As hydrophobic structures, carriers such as graphite, carbon tissue, metal structures of titanium, niobium, tantalum or zirconium may be employed which have become hydrophobic due to treatment with perflourinated synthetic material.

The other material distribution systems utilized in accordance with the present invention are, by way of example, porous sintered bodies made of titanium, niobium, tantalum or zirconium having a mean pore size from 1–200 μm and a thickness of 0.5–2 mm. Fine wire mesh made of titanium, niobium, tantalum, zirconium or platinum may also be employed.

The used collectors are provided with coarse structures made of titanium, niobium, tantalum or zirconium which possess the mechanical stability for pressing the cells together, make the water and gas transport to the material distribution structures possible and permit drawing the current.

Advantageously, the cells have an ion exchange membrane as the electrolyte. Best suited for this has proven to be a cation exchange membrane, as e.g. the commercially available NAFION® 117, semipermeable membrane of poly(perflouroalkylen)-sulfonsäure manufactured by DuPont de Nemours.

The apparatus of the present invention has a cell which is operated in accordance with the present invention in such a manner that during electrolysis oxygen is formed at one electrode and during fuel cell operation hydrogen is oxidized. At the other electrode, hydrogen is formed during electrolysis and oxygen is reduced during fuel cell operation.

In order to be able to supply this bifunctional oxidation, or reduction electrode with the corresponding gasses, or with $H_2O$, the cell is constructed in such a manner in accordance with the present invention that both the anode compartment and the cathode compartment have suitable inlets, or outlets. Especially advantageous is if the inlets, or outlets, are connected to control devices, e.g., multiway valves. In this way, it can be ensured that the gas can be switched by simply turning such a multiway valve if there is a corresponding gasline for conducting gas to and from the water reservoir and the gas storage means.

Other objects, advantages and novel features of the present invention will become apparent from the following detailed description of the invention when considered in conjunction with the accompanying drawings.

DETAILED DESCRIPTION OF THE DRAWINGS

Figure 1:
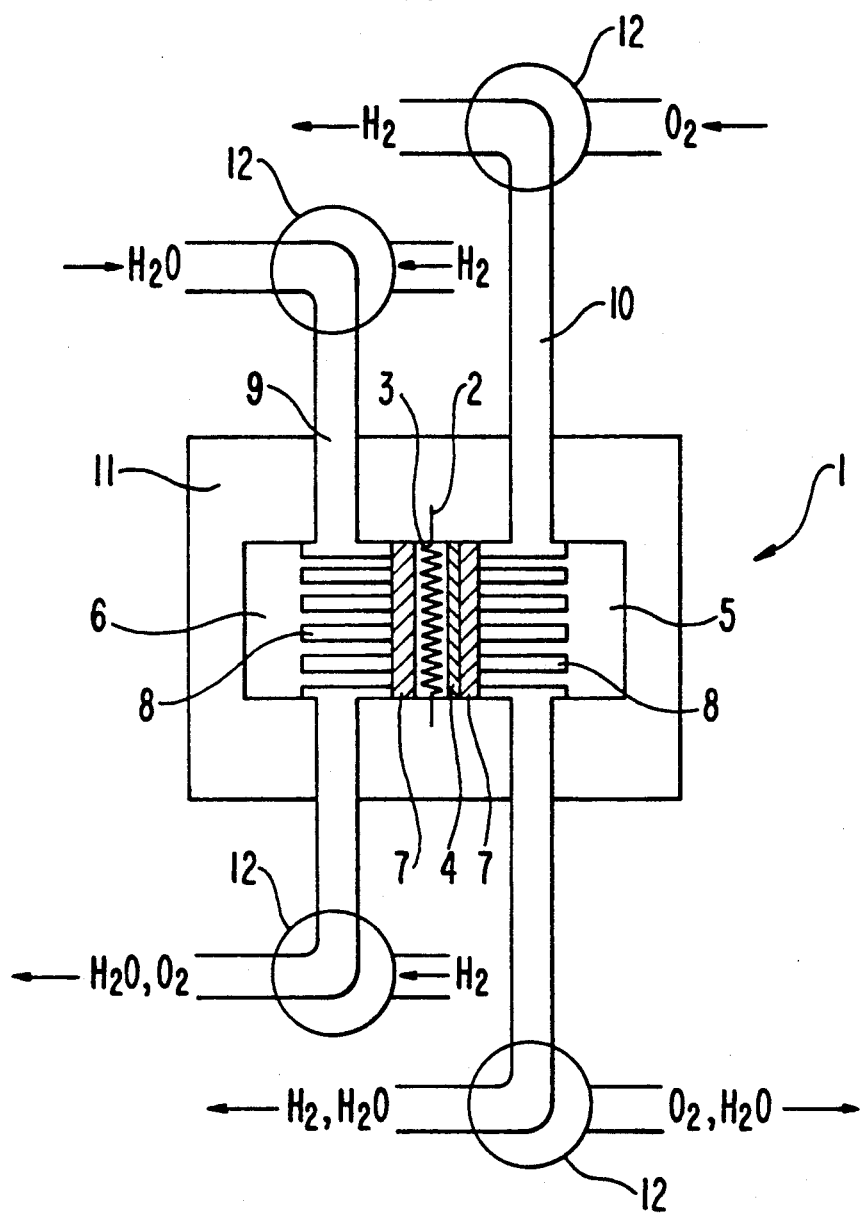
FIG. 1 shows a cell constructed in accordance with an embodiment of the present invention.

FIG. 1 depicts a cell (1) as it is employed in the process of the present invention. The cell (1) comprises a cation exchange membrane (2) which simultaneously serves as an electrolyte and a separator and to which a catalyst layer (3) is brought as close as possible. On the cathode side (5), a hydrophobic structure (4), e.g., hydrophobic graphite paper is applied directly onto the catalyst layer (3) ensuring during the fuel cell operation that the reaction and transfer water transported out on this side of the cation exchange membrane (2) does not cover the catalyst layer (3) with a film of water which would greatly hamper, or prevent, the transport of the oxygen gas to the catalyst. On both sides of the membrane (2), there follows a material distribution system (7), e.g. made of highly porous sintered metal filters of titanium and a coarse titanium structure, which serves as a current collector. A channel (8) is used to let the $H_2O$ flow along the surface of the membrane (2). Transport to and from of products and educts occurs via an inlet or outlet (9, 10) for each electrode compartment. The cell (1) is constructed in such a manner that by pressing together the components of the housing (11) the membrane (2) is built-in gas-tightly between the anode compartment (6) and the cathode compartment (5). The 3-way valves (12) sketched in FIG. 1 illustrates the position for electrolytic operation.

In electrolytic operation, on the anode side which is connected to the positive pole of a suitable direct current voltage, distilled water is conducted in a cycle through the anode compartment which then transports the resulting oxygen produced by the reaction $H_2O \rightarrow 1/2 O_2 + 2H^+ + 2e^-$. On the cathode side which is connected to the negative pole of this direct current voltage, the protons conducted through the membrane are reduced to hydrogen following $2H^+ + 2e^- \rightarrow H_2$. The transfer water which is transported by the protons through the membrane and which also exits on the cathode side has to be separated from the hydrogen gas.

In order to change from operation as a hydro-electrolytic cell to operation as a $H_2/O_2$ fuel cell, the following procedure must be followed. After separation of the cell, from the current source, the cell is operated in such a manner that the hydrogen is on the anode side and the oxygen is on the cathode side. On the anode side, protons are formed according to $H_2 \rightarrow 2H^+ + 2e^- \rightarrow H_2O$. Each gas is conducted cyclically so that there is a constant flow of gas. In each cycle, there is a wetting agent and a heater which adjusts the gas to the required temperature and water content prior to entering the cell. On the cathode side, after the cell, a water separator is also required which collects the reaction and transfer water accumulating there. The anode side of the cell has to be connected to the negative pole of a current sink. Before the fuel cell has full activity, a 1–2 hour activating phase has to be maintained during which only a very low current of approx. 1 mA/cm$^2$ may be drawn. In order to change from fuel cell operation to electrolytic operation, the exact opposite has to be carried out. An activating phase is then no loner necessary.

Figure 2:
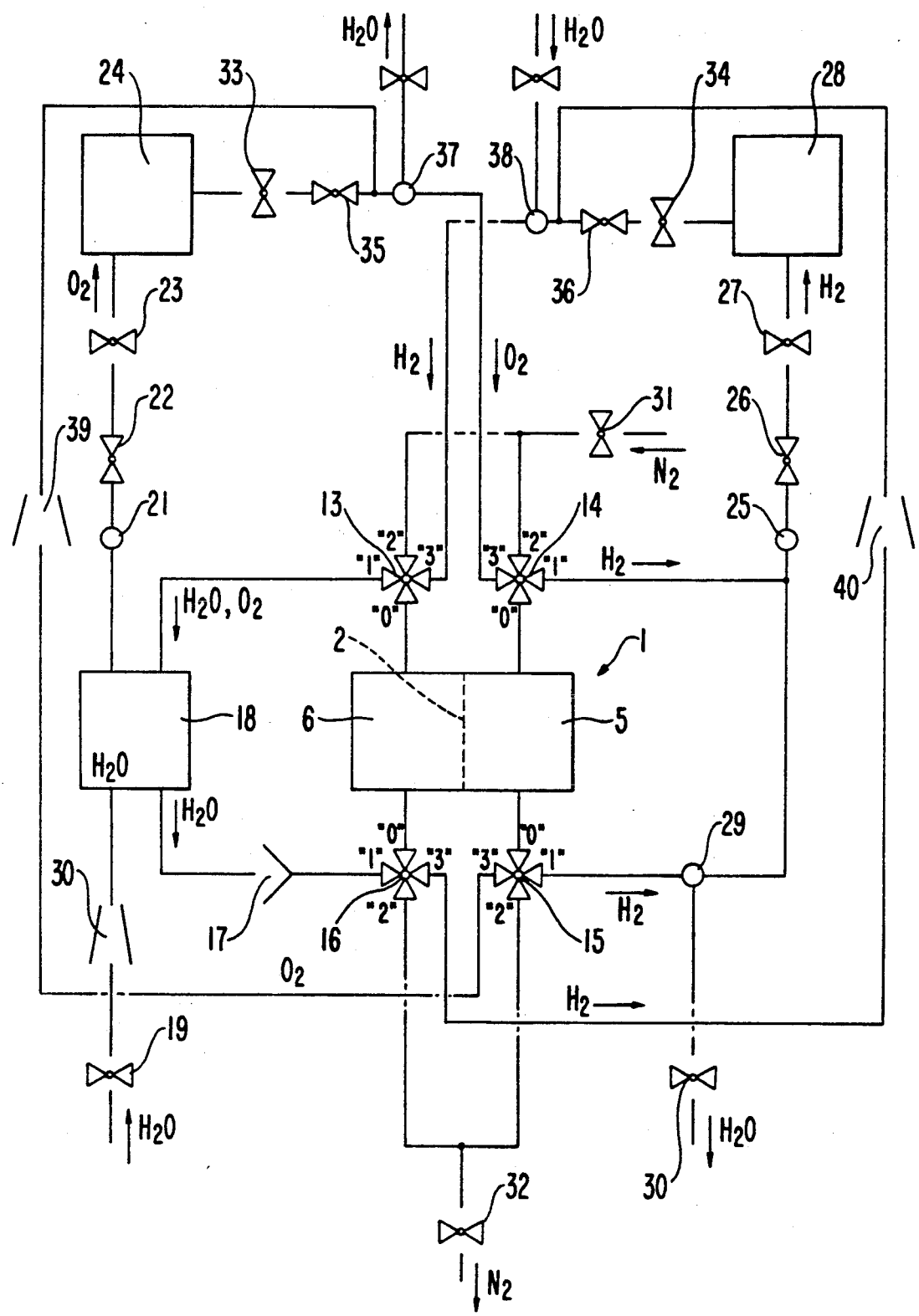
FIG. 2 shows the flow chart of an embodiment of the process of the present invention for operation of the cell of FIG. 1.

FIG. 2 shows a diagram of the process of a cell of this type. The steps of the process are made more apparent. The anode compartment (6) and the cathode compartment (5) are connected to each inlet and outlet by means of a 4-way valve (13, 14, 15, 16). The numbers given as indices show the position of such a valve. If all 4-way valves are positioned in such a manner that positions "0" and "1" are connected, the cell (1) can be operated as an electrolytic cell by applying the positive pole of a direct current voltage to the anode side (6) and the negative pole to the cathode side (5). Distilled water, which is driven by a pump (17), circulates cyclically through the anode compartment (6). The container (18) functions as a water reservoir and gas separator. Used water can be added during electrolytic operation via the valve (19) with the pressure pump (20). The separated oxygen (which serves as an electron acceptor) is stored in the $O_2$-tank (24) via the gas dryer (21), the back-pressure valve (22) and the stop valve (23). The hydrogen (which serves as an electron donor) evolving in the cathode compartment (5) is conducted into the H₂-tank (28) via the gas dryer (25) and the back pressure valve (26) and the stop valve (27).

The water diffused through the membrane (2) into the cathode compartment (5) is collected in water separator (29) and may be drained during operation via the valve (30). In order to switch from electrolytic operation to fuel cell operation, the cell (1) is, without being connected via an exterior electric circuit, scavenged with nitrogen by turning the 4-way valve (13, 14, 15, 16) into the joint of positions "0" and "2" and by opening valves (31, 32). After closing the valves (31, 32), the valves (13, 14, 15, 16) are brought into the joint of positions "0" and "3" so that oxygen is put into the cycle through the cathode compartment (5) and hydrogen in the cycle through the anode compartment (6). The gases are entered into the gas cycle from the gas storage means (24, 28) via stop valve (33, 34) and a pressure-reducing valve (35, 36). The gas cycle has a wetting-means-condenser unit (37, 38) installed before the cell (1) and a gas pump (39, 40) respectively after the cell (1). With the positive pole of current sink at the cathode side (5) and the negative pole of this current deathinium at the anode side (6), a current 1 mA/cm² is drawn for two hours for activation. Following this, the fuel cell has its full activity. The reverse switch from fuel cell operation to electrolytic operation ensues in reverse order of the above-described. An activating phase is not necessary.

In a first exemplary embodiment, a cell is employed having the construction of FIG. 1. For a membrane, the cell has a cation exchange membrane, in particular DuPont's NAFION ® 117, semipermeable membrane of poly(perflouroalkylen)-sulfonsäure. This membrane is coated on both sides with 5 mg/cm² Pt. Graphite paper manufactured by Sigri Electrographit GmbH hydrophobized with TEFLON ® (tetrafluoroethylene) is utilized as the hydrophobic structure. The material distribution system is composed of a 1 mm thick sintered disk of titanium with a mean pore size of 50 μm. Tin cycles of alternating 30 minute electrolytic operation and 30 minute fuel cell operation each were measured. In both instances, the cell was galvanistically loaded with 100 mA/cm². The working temperatures were 80° C., the gas pressure in the case of fuel cell function 2 bar. Constant voltage was measured for both types of function in the 10 cycles.

10 cycle test: Pt/Pt, 80° C., 2 bar gas pressure
average electrolytic voltage: 1.810 V 5 mV
average fuel cell voltage: =0.905 V 5 mV In a second exemplary embodiment, the membrane is coated on one side on the cathode side with 5 mg/cm² Pt and 5 mg/cm² rhodium oxide is sintered onto the titanium sintered body of the anode side.

10 cycle test: rhodium oxide/Pt, 80° C., 2 bar gas pressure
average electrolytic voltage: 1.685 5 mV
average fuel cell voltage: 0.875 5 mV Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for performing both an electrolytic operation and a fuel cell operation, comprising:

an electrochemical cell having an anode compartment, a cathode compartment and a cation exchange membrane as the electrolyte, said anode compartment having a bifunctional oxidation electrode and said cathode compartment having a bifunctional reduction electrode;

a hydrogen tank storing hydrogen;

an oxygen tank storing oxygen;

a first valve that connects the hydrogen tank to the anode compartment to supply hydrogen to the anode compartment during the fuel cell operation, and connects the hydrogen tank to the cathode compartment to store hydrogen from the cathode compartment in the hydrogen tank during the electrolytic operation; and a second valve that connects the oxygen tank to the cathode compartment to supply oxygen to the cathode compartment during the fuel cell operation, and connects the oxygen tank to the anode compartment to store oxygen from the anode compartment during the electrolytic operation.

2. An apparatus according to claim 1, wherein the bifunctional oxidation electrode and the bifunctional reduction electrode each include a porous carrier and a catalyst layer applied to the porous carrier.

3. An apparatus according to claim 2, wherein said catalyst layer is made of materials selected from the group consisting of platinum, iridium, rhodium, ruthenium, palladium, oxmium, rhenium and alloys thereof and oxides thereof.

4. An apparatus according to claim 2, wherein said cell include a hydrophobic structure on said catalyst layer.

5. An apparatus according to claim 4, wherein said hydrophobic structure is graphite paper.

6. An apparatus according to claim 1, wherein said cell has a material distribution system.

7. An apparatus according to claim 6, wherein said material distribution system is porous sintered bodies.

8. An apparatus according to claim 7, further comprising current collectors in said cell.

* * * * *